United States Patent
Pluder et al.

(10) Patent No.: US 9,904,796 B2
(45) Date of Patent: Feb. 27, 2018

(54) LEADING SYSTEM DETERMINATION

(71) Applicant: SAP SE, Walldorf (DE)

(72) Inventors: Carsten Pluder, Spiesen-Elversberg (DE); Dinesh Ravindran, Bangalore (IN); Alain Bacchi, St. Laurent du Var (FR)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 14/871,390

(22) Filed: Sep. 30, 2015

(65) Prior Publication Data

US 2017/0091479 A1  Mar. 30, 2017

(51) Int. Cl.
  *H04L 29/06*  (2006.01)
  *G06F 21/62*  (2013.01)
  *G06F 17/30*  (2006.01)

(52) U.S. Cl.
  CPC .... *G06F 21/6227* (2013.01); *G06F 17/30085* (2013.01); *H04L 63/102* (2013.01)

(58) Field of Classification Search
  CPC ......... G06F 17/30088; G06F 17/30091; G06F 17/30082; G06F 17/30085; G06F 17/30117; G06F 3/0649; G06F 3/065; G06F 3/0652; G06F 21/62; G06F 21/6245; G06F 21/6227; H04L 67/1095; H04L 67/1097; H04L 67/10
  See application file for complete search history.

(56) References Cited

U.S. PATENT DOCUMENTS

| | | | |
|---|---|---|---|
| 7,653,666 B2 | 1/2010 | Brinkmoller et al. | |
| 7,680,830 B1* | 3/2010 | Ohr | G06F 17/30085 707/999.2 |
| 7,769,722 B1* | 8/2010 | Bergant | G06F 11/2097 707/681 |
| 2005/0216534 A1* | 9/2005 | Ikezawa | G06F 17/30188 |
| 2005/0288939 A1* | 12/2005 | Peled | G06F 21/10 709/229 |
| 2008/0126404 A1* | 5/2008 | Slik | G06F 17/30171 |
| 2008/0263297 A1* | 10/2008 | Herbst | G06F 17/30073 711/161 |
| 2010/0228937 A1 | 9/2010 | Bae et al. | |
| 2012/0221811 A1* | 8/2012 | Sparkes | G06F 17/30085 711/159 |
| 2014/0032600 A1* | 1/2014 | Sarferaz | G06F 12/14 707/781 |
| 2014/0082753 A1* | 3/2014 | Sarferaz | G06Q 10/06 726/30 |

(Continued)

*Primary Examiner* — Tae Kim
(74) *Attorney, Agent, or Firm* — Fountainhead Law Group P.C.

(57) ABSTRACT

Embodiments described herein relate to an improved technique for blocking access to data records associated with an entity in a network comprising a plurality of systems. The operations include accessing and analyzing determination criteria associated with the entity to determine in which systems the data should be blocked. An end-of-purpose determination can be performed in one or more of the systems based on whether the current system is a master system, a dependent system of the master system, or a standalone system of the plurality of systems. Access to the entity data records can then be blocked from the appropriate systems when an end of purpose for the data has been reached for any processes running on the system.

18 Claims, 12 Drawing Sheets

(56) References Cited

U.S. PATENT DOCUMENTS

| | | | |
|---|---|---|---|
| 2014/0109238 A1* | 4/2014 | Ravindran | G06Q 10/0635 |
| | | | 726/27 |
| 2014/0150060 A1* | 5/2014 | Riley | H04L 63/0428 |
| | | | 726/3 |
| 2014/0181020 A1 | 6/2014 | Kreindlina et al. | |
| 2014/0188804 A1* | 7/2014 | Gokhale | G06F 21/6218 |
| | | | 707/645 |
| 2015/0248419 A1* | 9/2015 | Motoyoama | G06F 17/30085 |
| | | | 726/1 |
| 2016/0142485 A1* | 5/2016 | Mitkar | H04L 67/1097 |
| | | | 707/681 |
| 2016/0224435 A1* | 8/2016 | Kripalani | G06F 17/30289 |

* cited by examiner

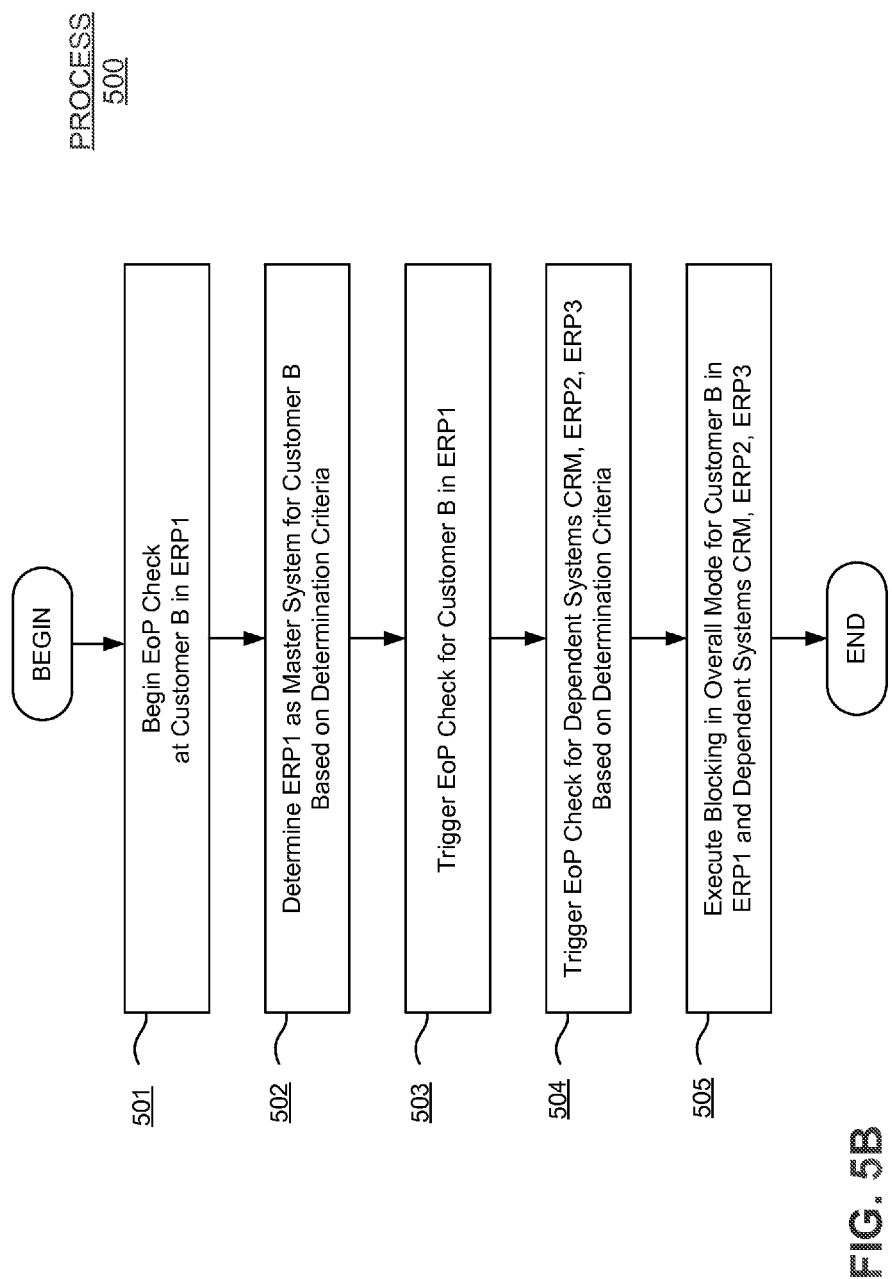

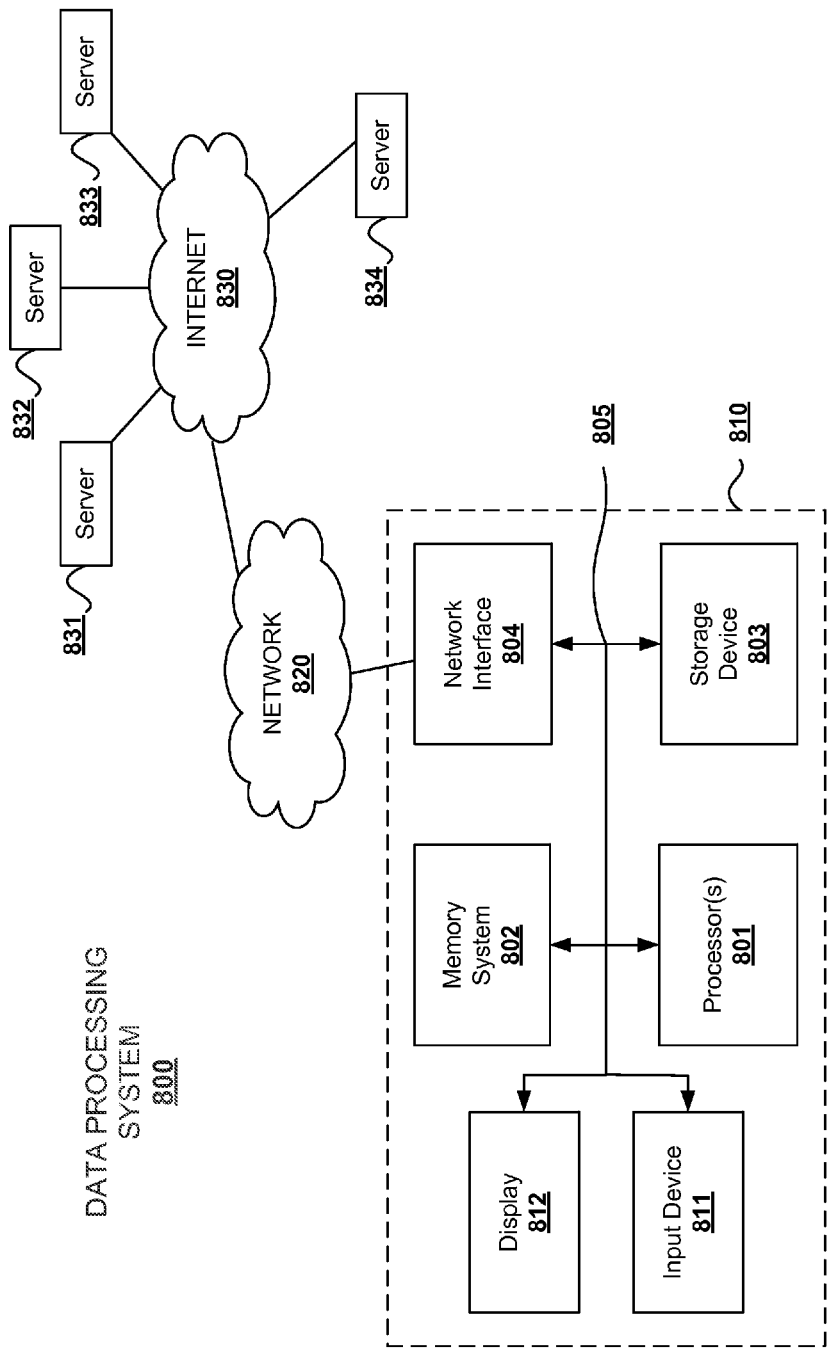

LEADING SYSTEM DETERMINATION

FIELD OF THE INVENTION

At least certain embodiments disclosed herein relate generally to information lifecycle management, and more particularly to managing access to user data in a multi-system landscape.

BACKGROUND

Companies adhere to data privacy laws for protecting private data. A general requirement for data privacy laws is to only use private data for the particular business purposes for which it was created, and to otherwise delete the data as soon as practical. Often private data cannot be deleted because of local or federal regulations regarding legal retention periods. When legal retention periods apply, retained private data is required to be blocked to restrict access to this data. After the retention period, the private data may be deleted from the relevant system(s).

To comply with data privacy laws, companies establish processes for blocking access to the private data after expiration of a residence time, and for deletion thereof upon expiration of a data retention time. But in multiple system landscapes where a plurality of systems have access to the data for various purposes, it would be advantageous to establish a mechanism for managing the blocking of data in the multiple systems.

SUMMARY

The embodiments described herein include a method for blocking access to data associated with an entity in a network comprising multiple systems. Access to data records can be blocked when it is determined that an end of purpose for the data has been reached and the applications running in the system no longer need access to the data for a business purpose. In one embodiment, the data described herein refers to private data records of an entity that are subject to retention time restrictions.

The embodiments include receiving an indication in a current system of the plurality of systems of an occurrence of an event that indicates an end of purpose determination is to be performed for one or more applications utilizing data records associated with an entity; analyzing determination criteria associated with the data records of the entity to determine whether the current system is a master system of the plurality of systems, where the determination criteria includes an identifier of the master system; performing an end-of-purpose determination in the current system and its dependent systems when the current system is determined to be the master system based on the determination criteria; blocking access to the data records of the entity when it is determined that the end of purpose has been reached; and determining whether the entity exists in the master system based on the determination criteria when the current system is not the master system The determination criteria includes an identifier indicating which of the plurality of systems is the master system. If the current system is not the master system and the entity does exist in the master system, a local end-of-purpose determination can be performed in the current system only, and a start-of-retention time indication can be communicated to the master system. The master system can then use this information once the end-of-purpose determination is triggered.

If the current system is not the master system and the entity does not exist in the master system, a local end-of-purpose determination can be performed in the current system and any of its dependent systems, and the entity data records can be blocked when it is determined that the end of purpose for the data records has been reached.

In another embodiment, a system for blocking access to data associated with an entity in a network comprising a plurality of systems is described. The system includes one or more processors in communication with a database via one or more communication links, and a memory system coupled with the processor(s). The memory system can be configured to store computer code, which when executed by the processor(s), causes the processor to perform operations including receiving an indication in a current system of the plurality of systems of an occurrence of an event that indicates an end of purpose determination is to be performed for one or more applications utilizing data records associated with an entity; analyzing determination criteria associated with the data records of the entity to determine whether the current system is a master system of the plurality of systems, where the determination criteria includes an identifier of the master system; performing an end-of-purpose determination in the current system and its dependent systems when the current system is determined to be the master system based on the determination criteria; blocking access to the data records of the entity when it is determined that the end of purpose has been reached; and determining whether the entity exists in the master system based on the determination criteria when the current system is not the master system.

The determination criteria includes an identifier indicating which of the plurality of systems is the master system. If the current system is not the master system and the entity does exist in the master system, a local end-of-purpose determination can be performed in the current system only, and a start-of-retention time indication can be communicated to the master system. The master system can then use this information once the end-of-purpose determination is triggered.

If the current system is not the master system and the entity does not exist in the master system, a local end-of-purpose determination can be performed in the current system and any of its dependent systems, and the entity data records can be blocked when it is determined that the end of purpose for the data records has been reached.

In yet other embodiments, a non-transitory computer readable storage medium tangibly embodying computer code is described. The computer readable storage medium can be configured for performing operations for blocking access to data associated with an entity in a network comprising a plurality of systems. The operations include receiving an indication in a current system of the plurality of systems of an occurrence of an event that indicates an end of purpose determination is to be performed for one or more applications utilizing data records associated with an entity; analyzing determination criteria associated with the data records of the entity to determine whether the current system is a master system of the plurality of systems, wherein the determination criteria includes an identifier of the master system; performing an end-of-purpose determination in the current system and its dependent systems when the current system is determined to be the master system based on the determination criteria; blocking access to the data records of the entity when it is determined that the end of purpose has been reached; and determining whether the entity exists in the master system based on the determination criteria when the current system is not the master system.

The determination criteria includes an identifier indicating which of the plurality of systems is the master system. If the entity does exist in the master system, a local end-of-purpose determination can be performed in the current system only, and a start-of-retention time indication can be communicated to the master system. The master system can then use this information once the end-of-purpose determination is triggered.

If the current system is not the master system and the entity does not exist in the master system, a local end-of-purpose determination can be performed in the current system and any of its dependent systems, and the entity data records can be blocked when it is determined that the end of purpose for the data records has been reached.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

FIG. 5B depicts a flow chart of an example embodiment of a process for blocking data access in a network comprising a plurality of systems according to the techniques described herein.

FIG. 8 depicts an example overview block diagram of a data processing system upon which the embodiments described herein may be implemented.

DETAILED DESCRIPTION

Figure 1:
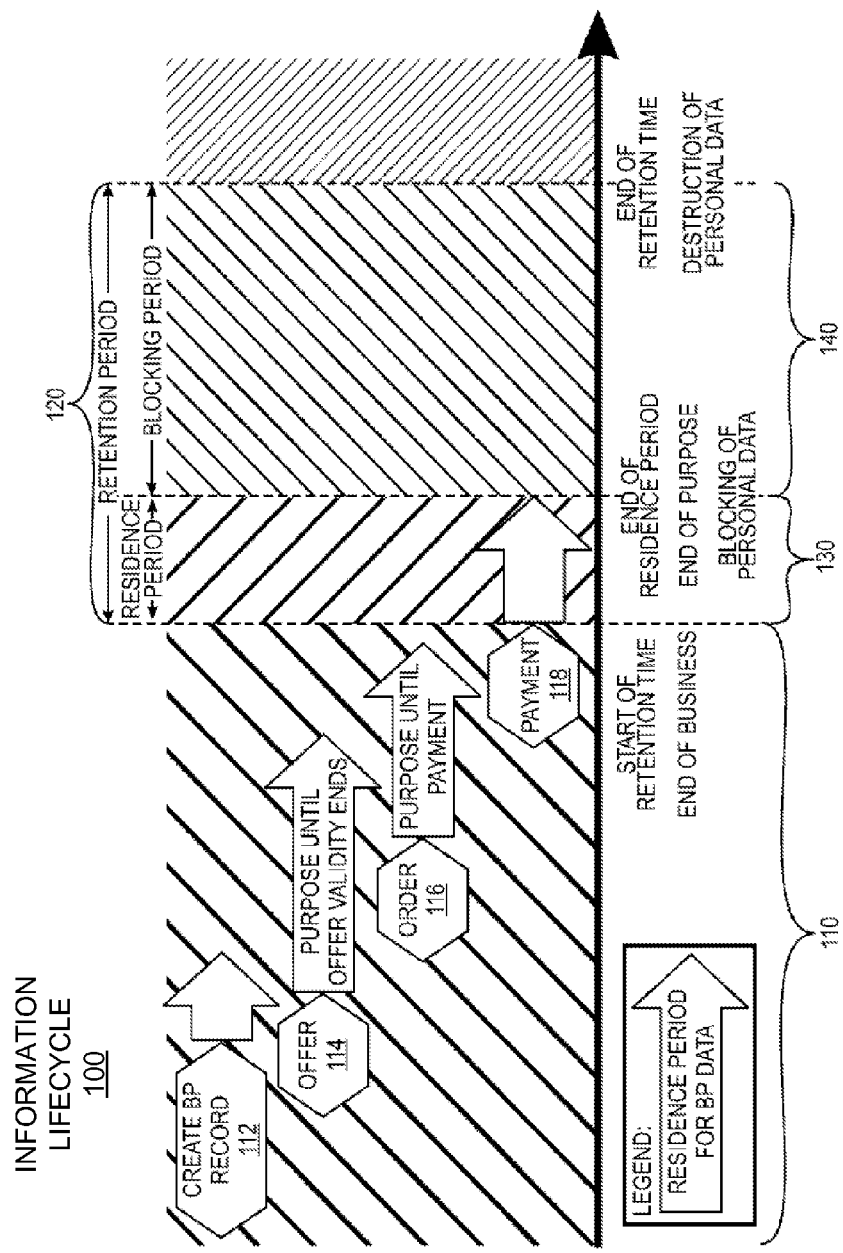
FIG. 1 depicts an example embodiment of a timing diagram showing an information life cycle for blocking data access according to the techniques described herein.

Throughout the description, for the purposes of explanation, numerous specific details are set forth in order to provide a thorough understanding of the present invention. It will be apparent to one skilled in the art, however, that the techniques described herein may be practiced without some of these specific details. In other instances, well-known structures and devices may be shown in block diagram form to avoid obscuring the underlying principles of the invention.

In at least certain embodiments described herein systems and methods that implement blocking of data in a multiple system landscape are disclosed. Novel processes provide for the blocking of entity records in a system database after the elapse of a residence time and for the deletion of data records associated with the entity after retention time expires. In one embodiment, the data records described herein can refer to private data of a business partner entity that is subject to retention time restrictions. There are general legal requirements that instruct companies to treat private data with special care. These legal requirements can permit companies to use private data only for particular business purposes (e.g., order fulfillment) and then to delete the data thereafter as soon as it is not required anymore for the particular purpose (e.g., after two years when warranty is expired, etc.).

There can be conflicting regulations between privacy laws and other laws, codes, and/or regulations that an organization must follow. For example, in some jurisdictions private data should not be deleted because of regulations in the form of legal retention periods (e.g., companies must keep invoice documents 10 years for audit purposes, etc.). When there are conflicting legal retention periods applied to the private data, embodying systems and methods described below can be configured to block access to the data when the business purpose expires. As used herein, the term "blocking" refers to restricting access to data to prevent it from being used. Only a few privileged users can have further access—such as data privacy officers or auditors.

An amalgamation of these legal requirements can result in an organization's collection and usage of private data to be within certain boundaries. For example, organizations can store and use private data only if they need this data to fulfill clear business purposes (e.g., fulfillment of orders or contracts, consumer has explicitly agreed to receive newsletters, etc.). In addition, strict privacy laws can require an organization to delete private data as soon as there is no longer a need to fulfill a business purpose. The process of deletion as used herein refers to one or more processes adapted to render stored private data unrecognizable and unreadable.

After deletion of private data, it should not be possible to identify either a particular user or the data which identifies the particular user. The deletion of private data with the intention to destroy information is also referred to herein as "destruction" or "erasure." In the context of data privacy the terms "erasure," "destruction," "destroy," and "deletion" are used herein synonymously. In compliance with the privacy laws, private data should be erased if there is no purpose which requires the storage and usage of private data.

If deletion is not an option (e.g. due to legal retention period requirements), an organization should block the private data until the end of the legal retention period. To implement compliant blocking, laws and regulations may require that an organization restrict access to private data to authorized staff only and prevent processing of private data after blocking.

Embodiments described herein can therefore be adapted to provide data privacy information lifecycle management tools for enterprises to comply with the various laws and regulations governing the retention of information. As used herein, the term "information lifecycle management" refers to managing an organization's data along its lifecycle, from the time of its initial generation in an application system, through its long-term retention in a data storage system, and, finally, until its destruction at the end of its lifecycle.

Various management units can be provided to manage business partner data and associated data relevant to business processes and applications running within the multiple system landscape. As used herein, the term "business partner" ("BP") refers to any entity including actual business partners, customers, vendors, consumers, prospective customers, employees, agents, technical staff, contractors, etc. A business partner can be represented by data objects representing persons, organizations, or groups of persons or organizations. The systems described herein can be adapted to communicate with one or more databases configured to store data records associated with business partners. These business partner records can include various data fields containing names, addresses (e.g., office, home, etc.), roles (e.g., contact person, employee, title, etc.), private circumstances (e.g., marital status, custody, etc.), role in business processes (e.g., prospect, customer, vendor, etc.), communication identifiers (e.g., telephone numbers, fax numbers, e-mail addresses, etc.), and perhaps other identifiers that can be used to identify a business partner. Under data privacy laws, this information can be viewed collectively as "private data".

FIG. 1 depicts an example embodiment of a timing diagram showing an information life cycle for blocking data access according to the techniques described herein. In the illustrated embodiment, information lifecycle 100 can include a data usage period 110 and a retention period 120 that further includes a residence period 130 and a blocking period 140. The interrelation of these periods is depicted in FIG. 1.

As shown, data usage period 110 can begin with the creation of a business partner data record 112 and can terminate with when the business purpose is over. An offer 114 (or other business purpose) can then be extended to the business partner. There can be a valid reason to retain private data until the business purpose expires. If the offer is accepted and an order 116 is placed, the private data can still be retained for a period of time, for example it can be retained until time of payment. Once payment 118 is received, the validity of retaining the private data can expire after a period of time.

Business partner data can be stored in the database as database entries associated with data objects such as a business partner, sales order, article, contract, purchase order, material, payment, bank account, loan contract etc. The data objects can represent a specific view of well-defined and outlined business content. The objects can be classified into master data such as business partner data and/or application data objects. In addition, data objects can use other data objects. For example, a sales order can refer to a business partner as customer or a sales order item can refer to an article for sale. A bank account can refer to a business partner as an account holder, and/or a payment order can refer to a receiver account, etc.

When it comes to blocking, archiving, and destruction of expired private data the dependencies between the business objects and the applications using the data records need to be taken into consideration. For example a business partner object can only be blocked (or archived) if applications using the object do not need the business partner record anymore because, for example, business activity with the real world business partner is completed and residence period 130 has ended.

The retention period 120 for the business partner data records refers to the period of time beginning after the data usage period expires and extending through to the time when that business partner data should be deleted from the database (or archived). The residence period 130 for the business partner data records refers to the period of time that elapses before the end-of-purpose point in time can be determined, and the business partner data can be blocked in the database (i.e., the beginning of blocking period 140). During the residence period the business partner data can remain in the database, data can be modified or revised, and new business can be created.

Information lifecycle 100 also includes other information lifecycle events such as a start-of-retention time ("SoRT") which can begin at the end of data usage period 110, an end-of-purpose time ("EoP") which can occur at the expiration of residence period 130, and an end-of-retention time ("EoRT") which can occur at the end of blocking period 140. There can also be dependencies between the business partner data record and the data utilized during operations of applications and the multiple system landscape.

Figure 2:
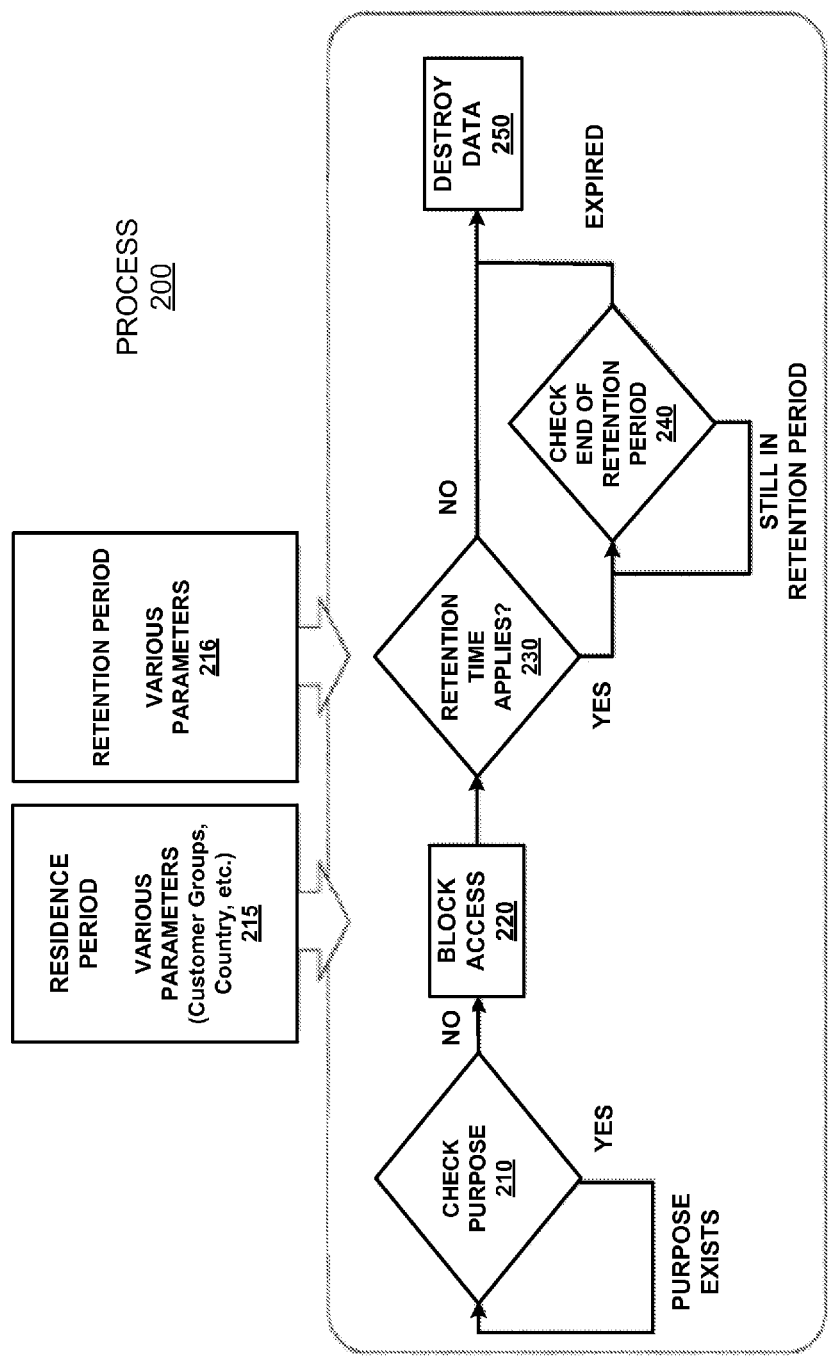
FIG. 2 depicts a flow chart of an example embodiment of a process for blocking data access according to the techniques described herein.

FIG. 2 depicts a flow chart of an example embodiment of a process for blocking data access according to the techniques described herein. In the illustrated embodiment, process 200 begins during data usage period 110 where it is determined whether there is still a purpose for accessing the data (operation 210). This end-of-purpose determination is performed by each application, and can be based on that application's specific need for accessing the private data. If there is a business purpose, process 200 remains in a loop to continue determining the validity of access.

If there is not a valid business purpose for an application to have access to the private data, process 200 continues to step 220 where access to the private data can be blocked for the particular application. The blocking can be determined from various parameters that can be application centric (e.g., residence period, retention period, customer groups, country, etc.), as well as based on jurisdictional requirements or even customer preference. In at least certain embodiments, the blocking can be achieved by setting a completion flag associated with the business partner object or data record. During the residence period 130 access to business partner records containing privacy data can be provided to general business applications and personnel having a business purpose. During the blocking period 140 access to business partner records can be restricted to authorize personnel only such as a corporate data privacy officer or IT staff (e.g., should it be necessary to correct access to an incorrectly blocked record).

A check can then be made to determine if a retention period applies for this data record (operation 230). Information lifecycle management rules that are based on various parameters can be utilized to make this determination. If a retention period applies, process 200 continues to operation 240 where a loop is entered to determine whether the retention period has ended. If the retention period has expired, process 200 proceeds to destroy the data (operation 250). If no retention period is applicable at operation 240, process 200 proceeds to destroy the data, step 250. Data destruction can follow predetermined methods that may be customized according to the nature of the data, the application, and/or the nature of the medium on which the data is stored.

Enterprises and other organizations can setup multiple systems in order to deploy applications that support their business processes. For example a customer relationship management ("CRM") application can be used to support processes in the area of sales and services such as marketing campaigns and new business origination, while an enterprise resource planning ("ERP") application can be used to run sales order execution, materials management, and accounting. Specific industries might have use of further applications and systems. In banking, for example, systems can be set up according to lines of business such as account management (cash and savings accounts) or loan management (consumer loans, mortgage loans, and business loans).

The various applications running in the organization's multi-system landscape can have a need to access the same business partner objects and data records. Under a multi-system landscape scenario, business partner data can be synchronized via replication between two systems. Embodiments can be configured to manage the information lifecycle of private data in multi-system landscapes by taking into consideration the overlapping data access by the various applications and systems.

Systems and methods in accordance with one or more embodiments can be configured to implement processes and other algorithms in accordance with one or more of the following data privacy scenarios: (1) blocking access to business partner data after residence time has expired—in a manner which only privileged users can thereafter access the data (the privileged users can include, e.g., an enterprise's data privacy or IT personnel); (2) deleting business partner data records from the database after retention time; and/or (3) deleting archived business partner data after retention time.

In many cases, however, the master data needs to be blocked in the current system. But the master data cannot be blocked until the originating (or "leading") system for the master data is known. In complex system landscapes, for example, if the process of blocking is not able to determine the leading or originating system of the master data, then the blocking of the master data cannot be accomplished in a reliable manner. Without the determining which of the multiple systems is the leading system, there is a risk that blocking the master data in a child system where it was replicated may not block the master data in the parent system.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are linked through one or more wire-based or wireless networks.

Figure 3A:
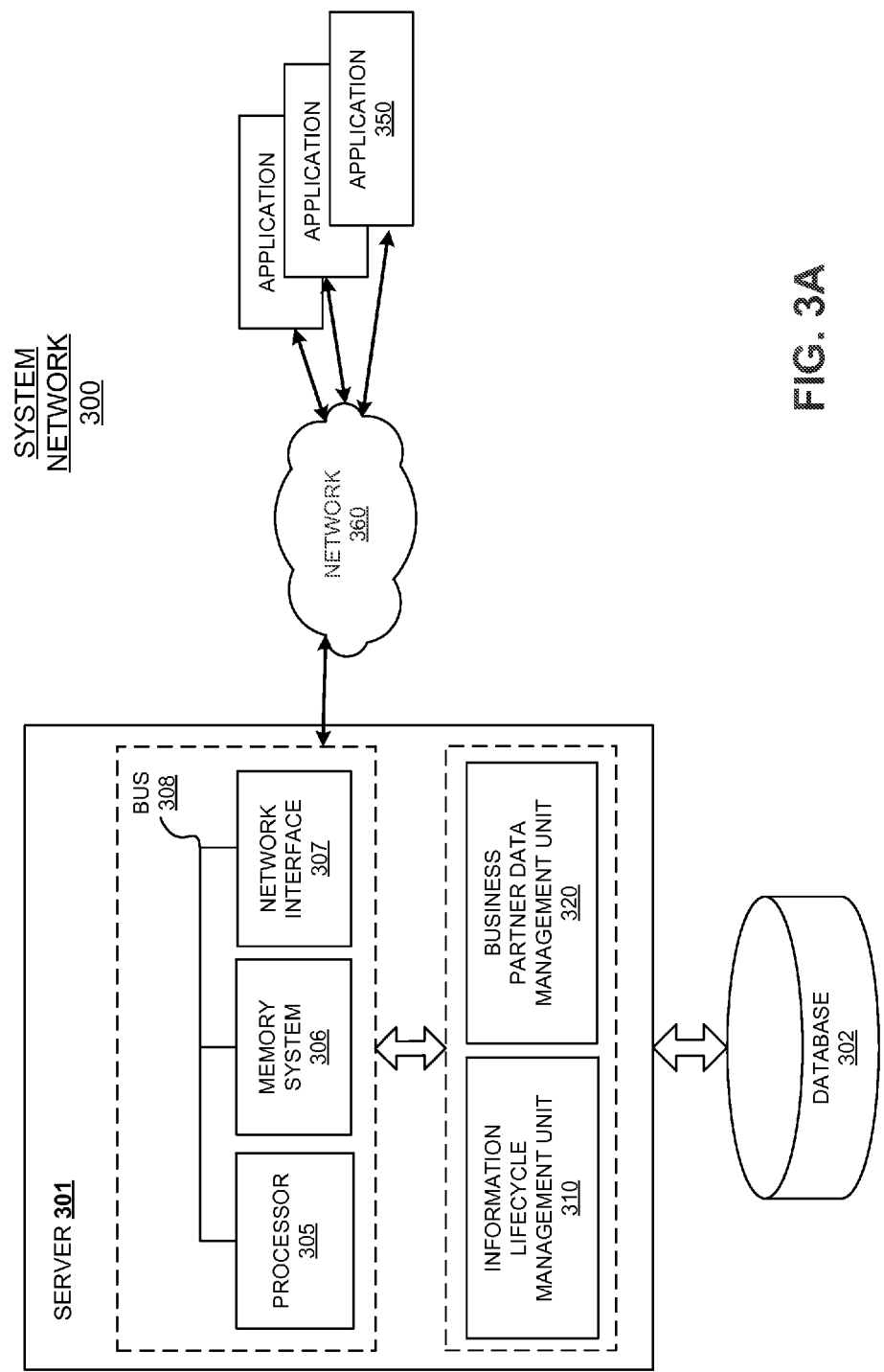
FIG. 3A depicts a block diagram of an example embodiment of a system network configured for blocking data access according to the techniques described herein.

FIG. 3A depicts a block diagram of an example embodiment of a system network configured for blocking data access according to the techniques described herein. In the illustrated embodiment, system network 300 includes a server 301 in communication with one or more applications 350 via one or more networks 360. The server 301 may be implemented as an individual computer hardware server, or as an array of computer hardware servers logically connected together and working in coordination with each other to perform the functionality described herein. Generally, a data server includes a system that performs data operations with respect to data stored in one or more repositories of data. Depending on the type of data server, data operations may range from simple operations, such as storing and retrieving the data, to more complex operations such as computing algorithms or calculating statistics based on the data, or arranging, modifying, or formatting the data.

In addition, server 301 is coupled to one or more databases 302. Server 301 may be in remote communication with the database 302 via one or more networks (not shown). Alternatively, the database 302 may be a component of the server 301 and configured to communicate with the server 301 via any type of interconnect line or network. Database (s) 302 may be implemented as any type of database system. One example embodiment includes a relational database system, in which data is stored in structured tables comprised of rows and columns, and accessed is provided through data storage rules ("schemas"). Other examples of database systems include event-based systems where data can be stored in a semi-structured or unstructured format.

In addition, database(s) 302 can contain definitions of the retention rules, residence rules, and rule variants that may be based on data privacy requirements. The rule variants can be used to analyze business partner records where the business is conducted in multiple jurisdictions having different data privacy requirements. Rule variants can be applied to relevant business partner records together with the retention rules and residence rules to calculate the residence-time period or the retention-time period.

In FIG. 3A, system network 300 also depicts a plurality of application processes 350 in communication with the server 301 via one or more network(s) 360. Applications 350 can be configured to perform data accesses operations on data stored in database 302 by communicating data access requests/commands to the server 301 via network(s) 360. Server 301 can be configured to receive the data access requests from applications 350 and to provide responses to the data access requests over the network(s) 360. As shown, server 301 includes a processor 305, a system memory 306, and a network interface 307, each coupled together via an interconnect bus 308.

As will be appreciated by skilled artisans, network(s) 360 can be a single network or multiple separate networks in communication with one another. Network(s) 360 can be implemented as any wired or wireless network(s). For example, the networks described herein can be implemented as a local area network ("LAN"), wide-area network ("WAN"), combination of LANs and WANs, the Internet, or any other type of communication network adapted for exchanging electronic messages and information. Further, network(s) 360 can be implemented as a physical array of hardware resources or as a virtual array, or any combination thereof; they can also be implemented in a cloud-based configuration. For example, the networks 360 described herein can be implemented as public or private cloud network or combination thereof. No specific network or network architecture should be construed as limiting the embodiments described herein.

Server can also include other various components and modules. These can include software modules stored in the memory system, hardware components such as application-specific integrated circuits, or any combination thereof, etc. As shown, server 305 includes an information lifecycle management unit 310 and a business partner data management unit 320.

Figure 3B:
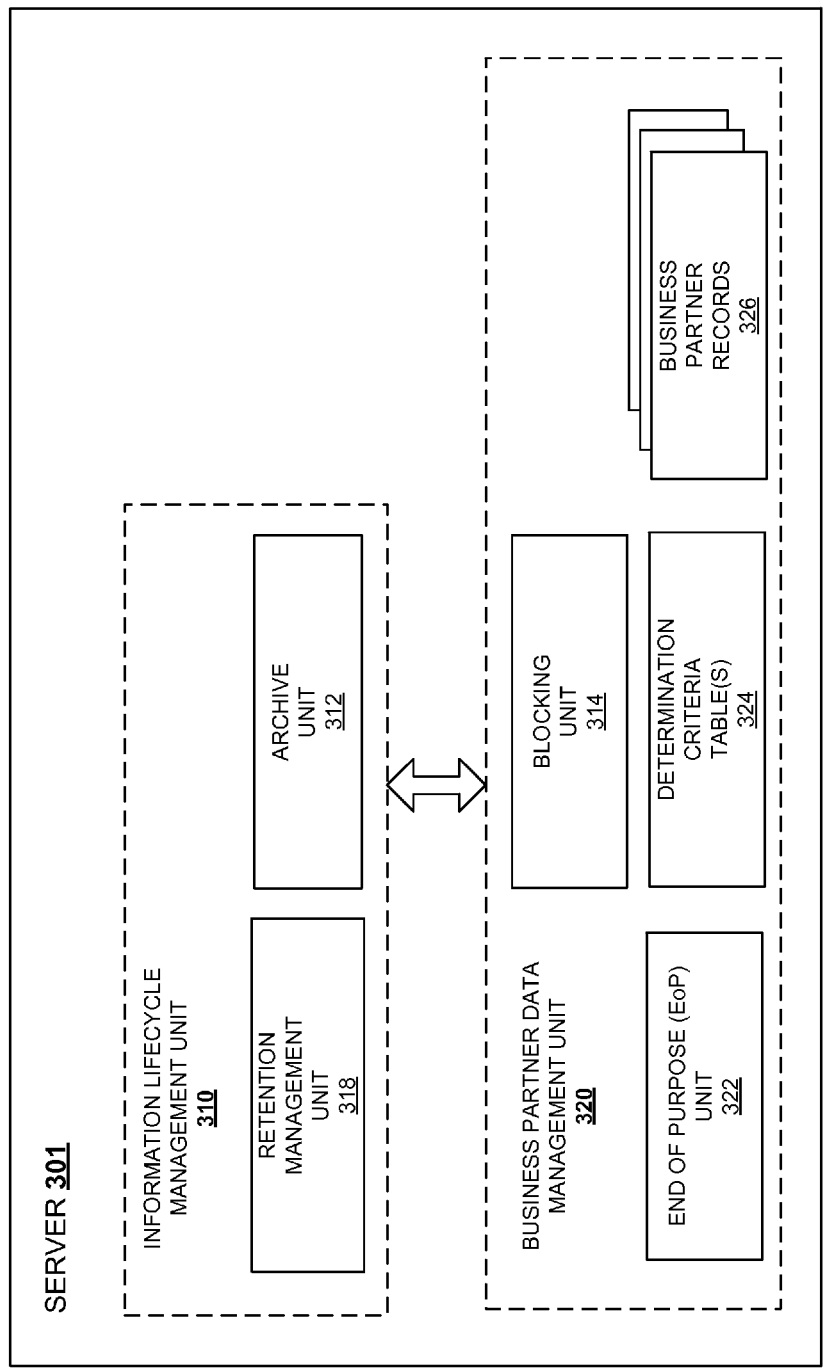
FIG. 3B depicts a block diagram of an example embodiment of computer server components configured for blocking data access according to the techniques described herein.

FIG. 3B depicts a block diagram of an example embodiment of computer server components configured for blocking data access according to the techniques described herein. In the illustrated embodiment, the details of the information life cycle management unit 310 and business partner data management unit 320 are shown. The information lifecycle management unit 310 includes a blocking unit 314, and archive unit 312, and a retention management unit 318; and the business partner data management unit 320 includes an end-of-purpose unit 322 as well as business partner records 326 and one or more determination criteria tables 324 to be discussed infra.

The information life cycle management unit 310 can support the definition and validation of retention and residence rules. Basic processes for archiving and deletion of business objects can also be provided by the information life cycle management unit 310. For instance, within the information life cycle management unit 310, archive unit 312 can be implement processes to archive information life cycle objects, which can be logical objects of related business data that are relevant for archiving and deletion.

Information lifecycle management unit 310 includes a retention management unit 318, which can be configured to implement the customization of residence time and retention time rules for one or more of applications 350. The retention management unit 318 can also calculate whether end-of-residence time has been reached for private data or whether the end-of-retention time has arrived for the blocked data.

The business partner data management unit 320 includes a blocking unit 314 that can prepare for blocking of data by checking the end-of-purpose determination, and can review block and unblock requests. The business partner data management unit 320 can support status management of private data and relationship data for one or more business partners. In one embodiment, the blocking unit 314 is configured to call an EoP interface 322. The EoP interface 322 is provided to perform the end-of-purpose determination for each business partner triggered via the blocking unit 314. The EoP interface unit 322 can perform an end-of-purpose determination to verify if the end of purpose has been reached for a particular set of data. Business partner data management unit 320 also provides archiving and deletion events for the database records associated with the business partner. In the lifecycle of a business partner, these events may represent different points of time.

Application processes 350 as shown in FIG. 3A that utilize the business partner data in their processes, can support and implement business partner data destruction scenarios due to the application's use and dependency on the business partner data. For example, a purchase order or bank account data can depend on the business partner. The end-of-purpose and start-of-retention time determinations can vary from application to application. Therefore the end-of-purpose determination can be customized for each specific application. These determinations can address the access restrictions implemented for the business partner private data that has been blocked after the residence time. The determinations can also be used to implement the archiving and deletion events described above.

The business partner data management unit 320 further includes various business partner data records 326 and associated determination criteria tables 324 discussed below.

II. Exemplary Processes

FIGS. 4, 5A-5B, 6A-6B, and 7A-7B depict example embodiments of processes for blocking data access in a network comprising a plurality of systems according to the techniques described herein. It is noted that the processes described below are exemplary in nature and are provided for illustrative purposes and not intended to limit the scope of the invention to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 4:
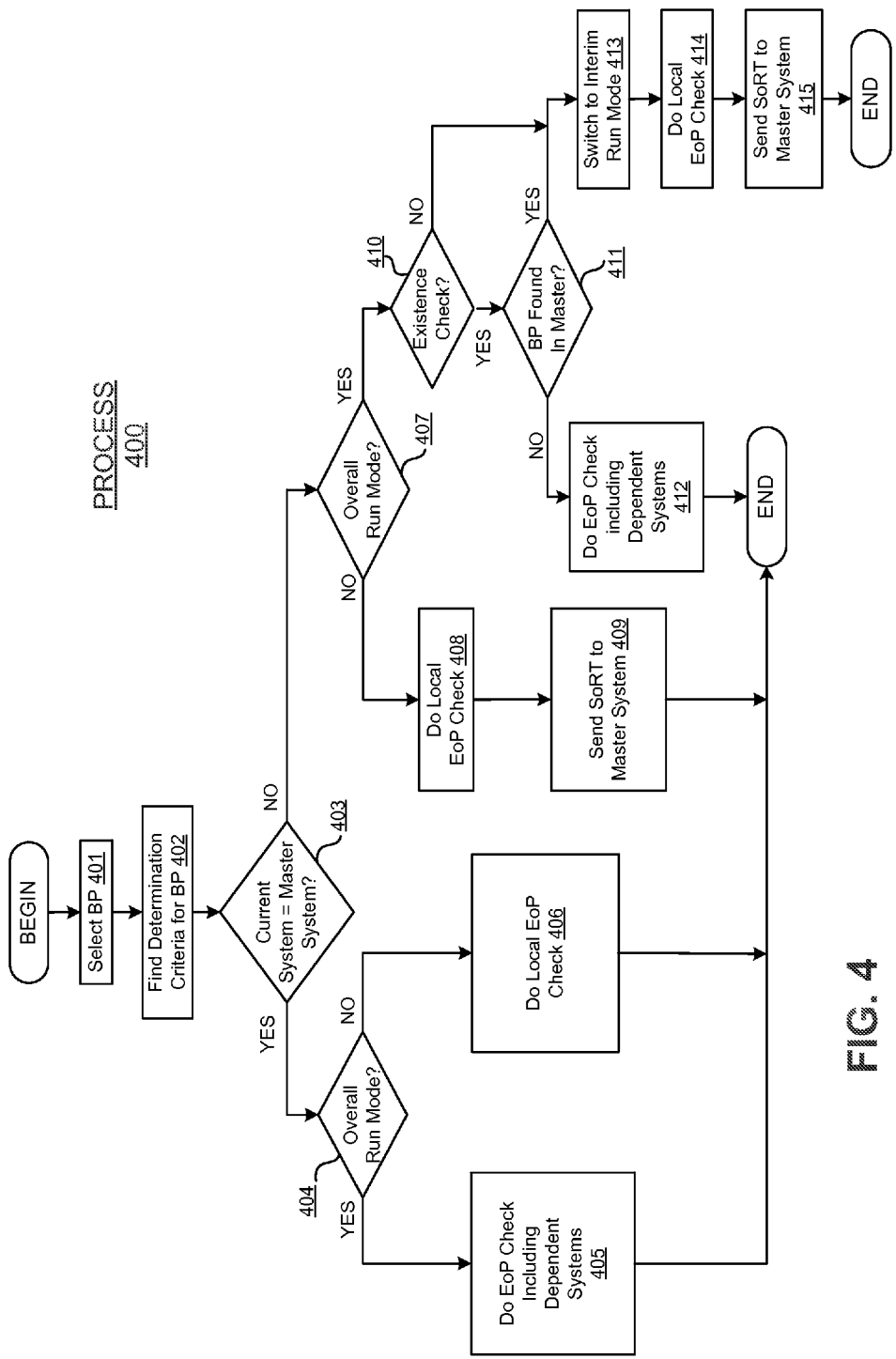
FIG. 4 depicts a flow chart of an example embodiment of a process for blocking data access in a network comprising a plurality of systems according to the techniques described herein.

FIG. 4 depicts a flow chart of an example embodiment of a process for blocking data access in a network comprising a plurality of systems according to the techniques described herein. After the residence time expires, business partner private data can be blocked in order to restrict access and to prevent further processing by the application(s). In some jurisdictions data blocking can be a prerequisite for deletion of private data when it requires that the data be retained after it has reached its end of purpose.

In the illustrated embodiment, process 400 begins at operation 401 where the blocking process is configured to select one or more business partners according to user-specific criteria to form a business partner list. For each business partner, all registered applications accessing that business partner's data records can be checked to determine whether the end-of-purpose for each application has been reached. This check can return a not applicable (N/A) status, a business ongoing status, or a business purpose complete (end of data usage period 110 and residence period 130) status, etc.

Access to the data can be blocked when it is determined that an end-of-purpose for the data has been reached and that the applications running in the network no longer need access to the data for a business purpose. Once an application determines that it has reached the end-of-purpose, it can return the start-of-retention time ("SoRT") that can be stored in a data record associated with the business partner. This data record can be in a specific table that contains SoRT for various applications and/or business partners. The SoRT information is used later by information life cycle management unit 310 to calculate the end-of-retention-time ("EoRT") for the private data. The private data can be blocked at the database by setting a completion flag in the business partner table for the associated private data.

The embodiments described herein are adapted to receive an indication that a triggering event has occurred in a current system of the plurality of systems and to initiate an end-of-purpose determination in the current system for a business partner based upon the occurrence of the triggering event. For example, when payment is received from a sales order, a trigger event indication can be received and processed to initiate and end-of-purpose determination in the system. As used herein, the "current system" may also be referred to as a "leading system" as it is the system in which the end-of-purpose determination functionality is initiated.

Process 400 continues at operation 402 by accessing "determination criteria" associated with the business partner. The determination criteria can be accessed from a determination criteria table 324 associated with a business partner record 326 as shown in FIG. 3B. In one embodiment, the determination criteria is created with the following fields (as an example) of table 1:

TABLE 1

| Field Name | Length | Description | Key |
| --- | --- | --- | --- |
| CLIENT | 03 | MANDT | X |
| DET_CRIT | 04 | Determination Criteria | X |
| IDX | 04 | Key index incremental | X |
| DET_CAT | 10 | Determination Category | |
| ROLE | 06 | BP Role | |
| ROLE_GRP | 06 | BP Role Group | |
| BP_TYPE | 04 | BP Type | |
| DATA_ORIGIN | 04 | Data Origin | |

The determination criteria can then be analyzed to determine whether the current system is a master system of the plurality of systems (operation 403). As discussed above, the "master system" refers to the system in which the data of the business partner was first created. The determination criteria can identify which of the plurality of systems is the master system.

When it is determined that the current system is the master system, it can be further determined whether the system is running an "overall run mode" or an "interim run mode" (operation 404). Overall run mode is the situation when the system is operating and productive. Overall run mode is run in the master system of the selected business partner. All applications running on the system can be checked. When applications confirm that the business purpose of the business partner is completed, the blocking indicator can be set. Blocking information is also distributed to all dependent systems. Interim run mode is a test mode for performing a local end-of-purpose determination in a particular system only.

If the current system is running in overall run mode, an end-of-purpose determination can be triggered in the current system and any dependent systems of the current system (operation 405). Access to the business partner data can be blocked from these systems when it is determined that the end-of-purpose has been reached for any processes running on the current system. If the system is running in the interim run mode, a local end-of-purpose determination can be performed on the current system only (operation 406).

On the other hand, when it is determined that the current system is determined not to be the master system, it can be further determined whether the system is running an overall run mode or interim run mode (operation 407). If the system is running in the interim run mode, a local end-of-purpose check can be performed for the current system (operation 408). And at operation 409, a start-of-retention time can then be sent to the master system (since the current system was not identified as the master system) when the particular process or application has reached its end-of-purpose.

If the current system is running an overall run mode at operation 407, the current system can perform an existence check to determine whether or not the business partner exists in the master system identified by the determination criteria (operation 410). If the business partner does not exist in the master system, the current system is referred to as a "standalone" system. In the standalone case, the current system becomes the master system for the standalone data. In such a case, an end-of-purpose determination can be triggered in the current (i.e., standalone) system and any of its dependent systems (operation 412), and access to the business partner data can be blocked from these systems when it is determined that the end-of-purpose has been reached for any processes running on the current system.

But if the business partner does exist in the master system, then the current system may be referred to as a "dependent" system of the master system. In such a case, the current system switches to an interim run mode (operation 413) and a local end-of-purpose determination is triggered in the current system only (operation 414). The start-of-retention time indication can then be communicated to the master system with the determined end-of-purpose status information (operation 415). The master system can then use this information once the end-of-purpose determination is triggered in an overall run mode.

As discussed above, the master system is the system in which the master data of the business partner was first created. The master data includes private data of the business partner that is subject to retention time restrictions. The start-of-retention time can be generated for the master data when it is determined that the end-of-purpose has been reached, and can be stored in a data record associated with the business partner.

And in cases when it is determined that the end-of-purpose has not been reached, continued access to the master data is allowed. This completes process 400 according to one example embodiment.

Figure 5A:
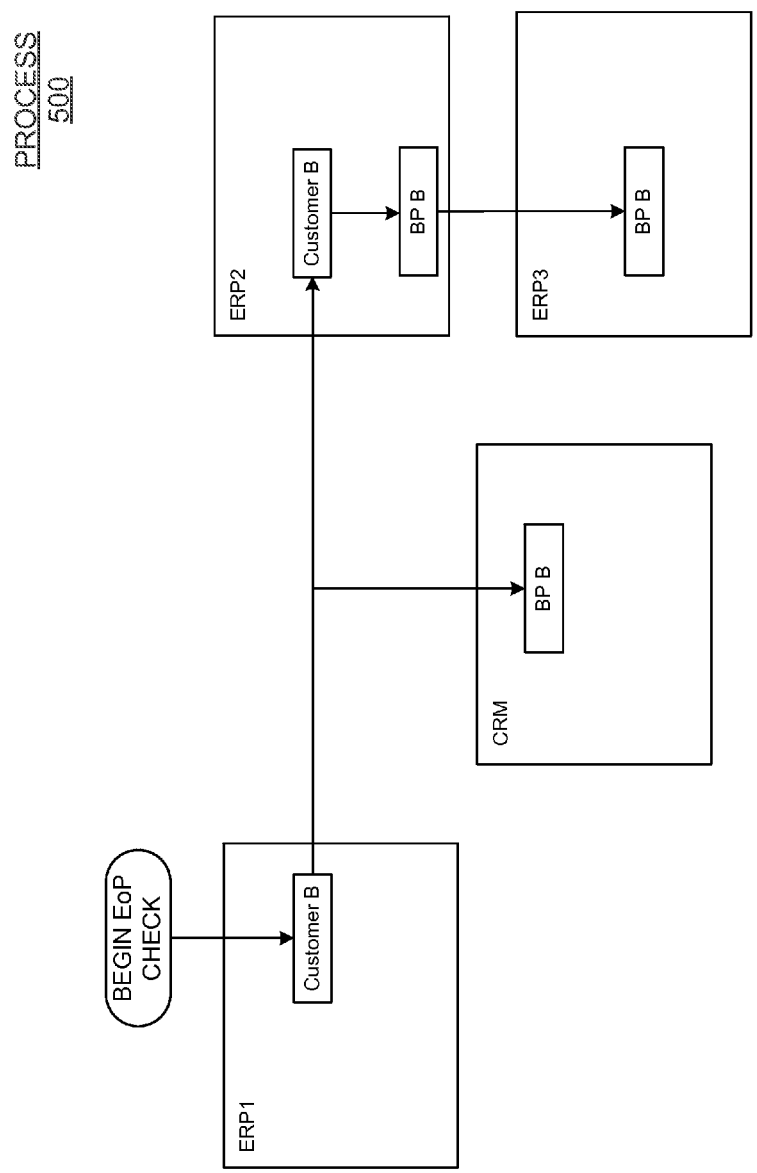
FIG. 5A depicts a block diagram of an example embodiment of a process for blocking data access in a network comprising a plurality of systems according to the techniques described herein.

FIG. 5A depicts a block diagram of an example embodiment of a process for blocking data access in a network comprising a plurality of systems according to the techniques described herein. In the illustrated embodiment, the plurality of systems include ERP1, ERP2, and ERP3, and a CRM system. As shown, customer B in ERP1 has been replicated as customer B in ERP2 and as business partner B in the CRM system. Further, customer B in ERP2 has been replicated as a business partner B in ERP2. Finally, business partner B in ERP2 has been further replicated as business partner B in ERP3.

The end-of-purpose determination is triggered for customer B within system ERP1. As discussed above, this can be the result of a triggering event received in system ERP1. FIG. 5B depicts a flow chart of an example embodiment of a process for blocking data access in a network comprising a plurality of systems according to the techniques described herein. In the illustrated embodiment, process 500 begins at operation 501 where the end-of-purpose ("EoP") determination is performed at customer B in ERP1.

The determination criteria can then be accessed to determine ERP1 as the master system for customer B based on the determination criteria. Table 2 below shows various tables that are referenced to access the determination criteria. These tables are shown with specific entries of each related system as they could be maintained for the used example.

TABLE 2

| | ERP1 CVP_EOP_CONS | | |
|---|---|---|---|
| Master | ERP1 ERP1 CVP_REGSYSREMOTE | DET_CRIT | B |
| Dependent | ERP2 ERP1 BUTREGSYS_REMOTE | DET_CRIT | B |
| Dependent | CRM CV->BP CRM BUTEOPCONS | DET_CRIT | B |
| Master | ERP1 ERP2 CVP_EOP_CONS | DET_CRIT | B |
| Master | ERP1 ERP2 BUTEOPCONS | DET_CRIT | B |
| Master | ERP2 ERP2 BUTREGSYS_REMOTE | DET_CRIT | B |
| Dependent | ERP 3 ERP 3 BUTEOPCONS | DET_CRIT | B |
| Master | ERP2 | DET_CRIT | B |

In at least certain embodiments, the "CVP_EOP_CONS" table refers to a database table containing customizations which define the leading/master system for the ERP customer/vendor specific and-of-purpose determination functionality. The "CVP_REGSYSREMOTE" table refers to a database table containing customizations which define the dependent systems for the ERP customer/vendor specific end-of-purpose determination functionality. The entries are maintained in the leading system. These systems are called during the end-of-purpose check from the leading (current) system.

The "BUTREGSYS_REMOTE" table refers to a database table containing customizations which defined the dependent systems for the business partner-specific end-of-purpose determination functionality. The entries are maintained in the leading system. These systems are called during the end-of-purpose determination from the leading system. The "BUTEOPCONS" table refers to the database table containing customizations which define the leading/master system for the business partner-specific end-of-purpose determination functionality.

Process 500 continues at operation 502 by determining ERP1 as the master system for customer B based on the determination criteria. The end-of-purpose determination for customer B in ERP1 can then be triggered (operation 503). The end-of-purpose determinations for customer B are also triggered for the dependent systems of ERP1 based on the determination criteria. In this embodiment, the dependent systems include CRM, ERP2, and ERP3. Blocking can then be executed in overall mode for customer B in ERP1 and dependent systems CRM, ERP2, and ERP3. This completes process 500 according to one example embodiment.

Figure 6A:
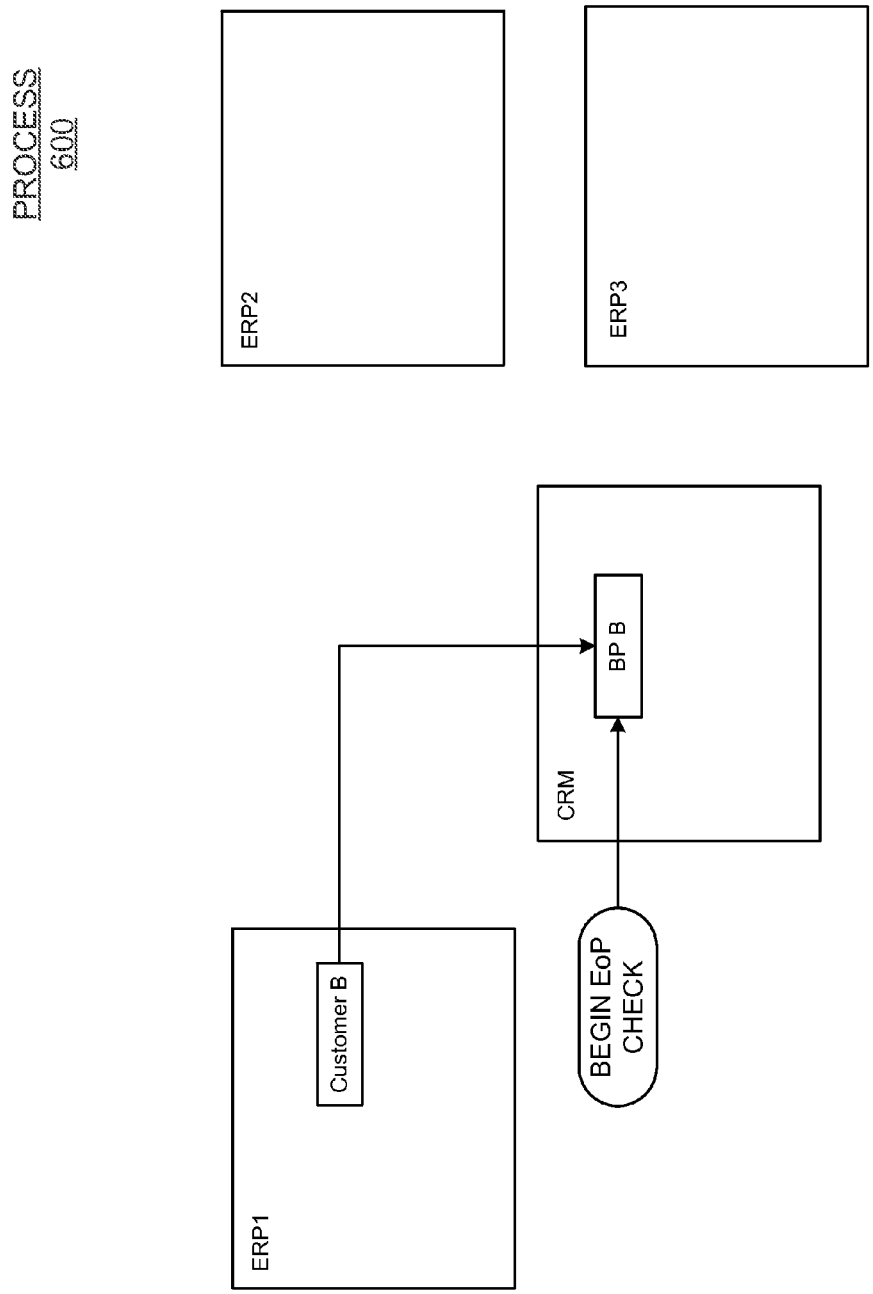
FIG. 6A depicts a block diagram of an example embodiment of a process for blocking data access in a network comprising a plurality of systems according to the techniques described herein.
Figure 6B:
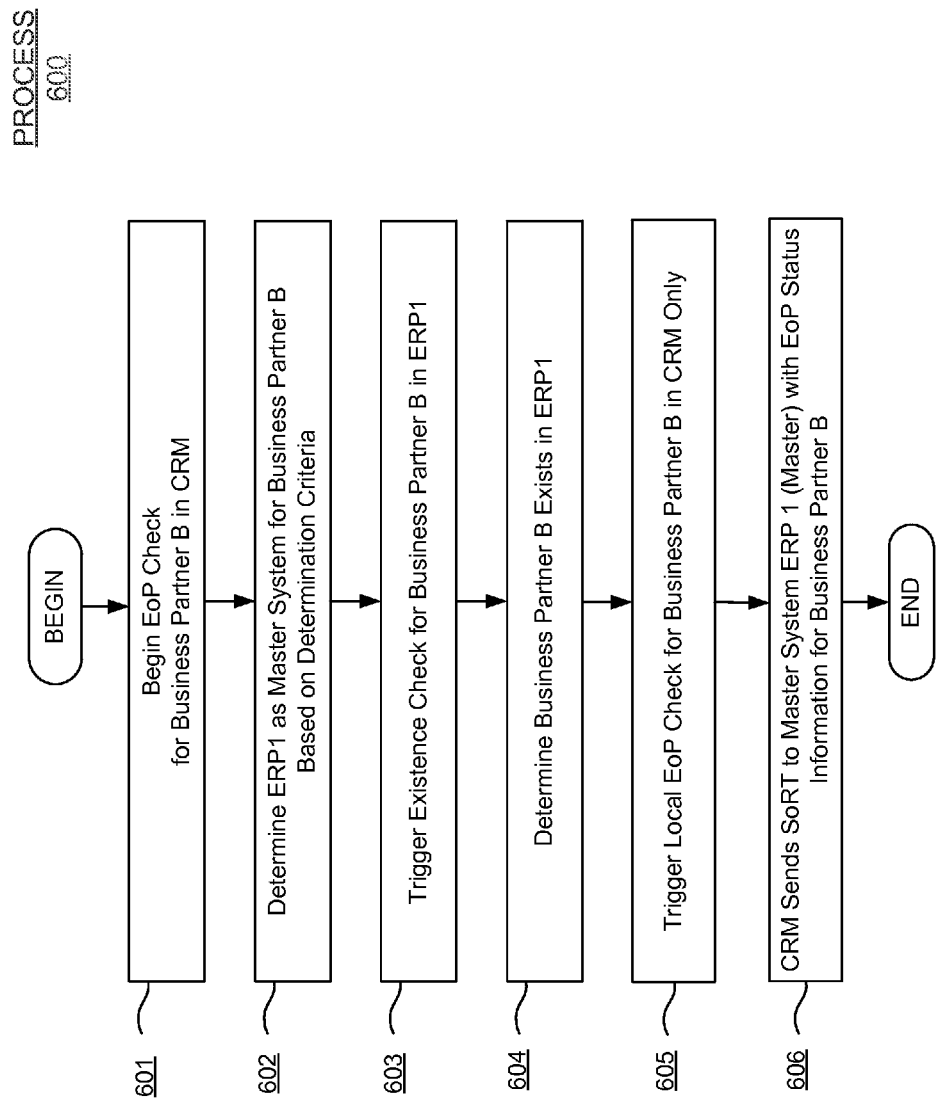
FIG. 6B depicts a flow chart of an example embodiment of a process for blocking data access in a network comprising a plurality of systems according to the techniques described herein.

FIG. 6A depicts a block diagram of an example embodiment of a process for blocking data access in a network comprising a plurality of systems according to the techniques described herein. In this example, customer B in ERP1 has been replicated as business partner B ("BP B") in the CRM system, but not in systems ERP2 or ERP3. FIG. 6B depicts a flow chart of an example embodiment of a process for blocking data access in a network comprising a plurality of systems according to the techniques described herein. In the illustrated embodiment, process 600 begins at operation 601 by performing an end-of-purpose determination for business partner B in the CRM system.

Process 600 continues at operation 602 where is determined that ERP1 is the master system for business partner B based on accessing the determination criteria. As discussed above, the determination criteria can be accessed from one or more determination criteria tables associated with the business partner or customer. An existence determination is then triggered for business partner B in ERP1 (operation 603), and at operation 604, it is determined that business partner B exists in ERP1. As a result, the CRM system is determined to be a "dependent" system, and a local end-of-purpose determination in interim mode is triggered for business partner B in the CRM system only (operation 605). The CRM system can then send the start-of-retention time indication to the master system ERP1 with the determined end-of-purpose status information for dependent business partner B (operation 606). This completes process 600 according to one example embodiment.

Figure 7A:
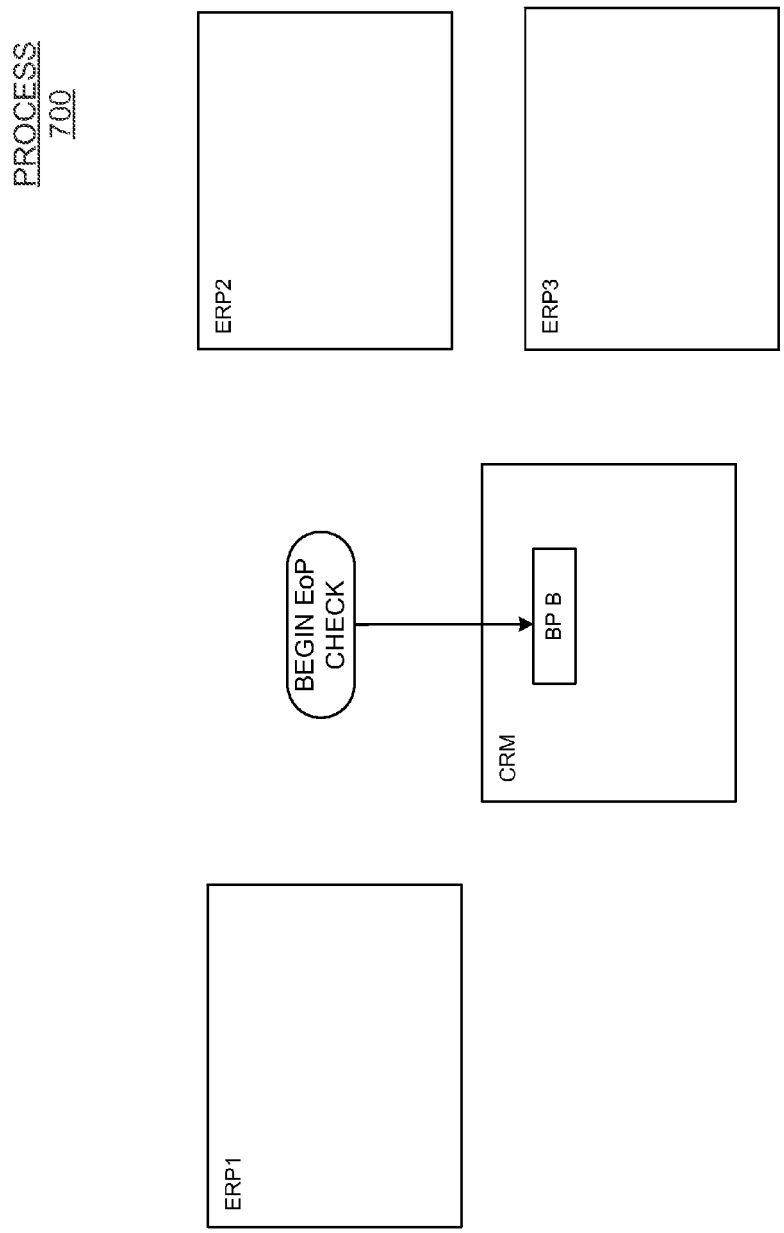
FIG. 7A depicts a block diagram of an example embodiment of a process for blocking data access in a network comprising a plurality of systems according to the techniques described herein.
Figure 7B:
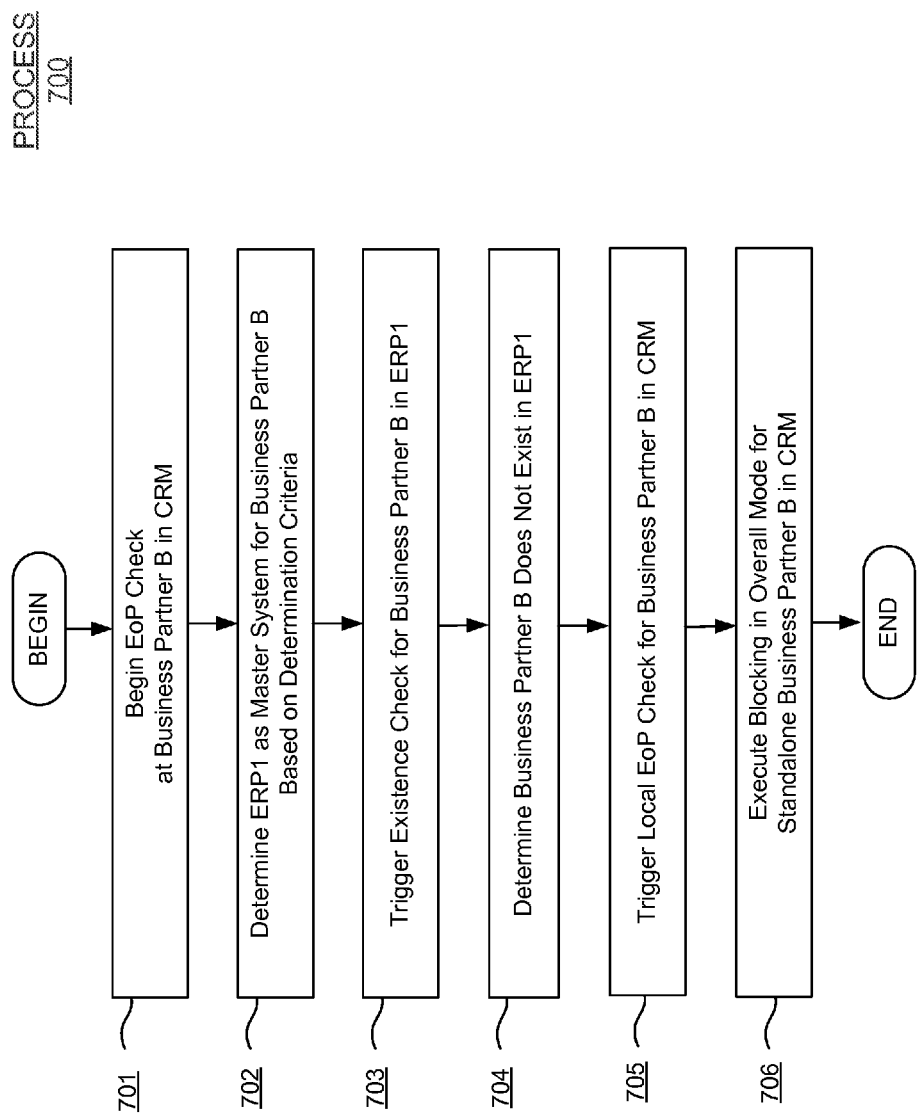
FIG. 7B depicts a flow chart of an example embodiment of a process for blocking data access in a network comprising a plurality of systems according to the techniques described herein.

FIG. 7A depicts a block diagram of an example embodiment of a process for blocking data access in a network comprising a plurality of systems according to the techniques described herein. In this example, business partner B has only been created in the CRM system. In such a case, it is referred to as a standalone system. FIG. 7B depicts a flow chart of an example embodiment of a process for blocking data access in a network comprising a plurality of systems according to the techniques described herein. Process 700 begins at operation 701 by performing an end-of-purpose determination at business partner B in the CRM system. The determination criteria can then be accessed and used to determine that ERP1 is the master system for business partner B (operation 702).

In this particular embodiment, an existence check is triggered for business partner B in ERP1 (operation 703). At operation 704 it is determined that business partner B does not exist in ERP1 (i.e., business partner B does not exist in the master system). Accordingly a local end-of-purpose check is triggered for business partner B in CRM (operation 705), and then blocking can be executed in overall run mode for standalone business partner be in CRM (operation 706). This completes process 700 according to one example embodiment.

III. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 8 depicts an example overview block diagram of a data processing system upon which the embodiments described herein may be implemented. The following hardware description is merely one example. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the invention. It will be apparent, however, to persons skilled in the art that these embodiments may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

What is claimed is:

1. A method for blocking data access in a network comprising a plurality of systems, the method comprising:
   receiving an indication in a current system of the plurality of systems of an occurrence of an event that indicates an end of purpose determination is to be performed for one or more applications utilizing data records associated with a plurality of related data objects on the plurality of systems, the data objects corresponding to an entity, and wherein the related data objects are synchronized between the plurality of systems;
   analyzing determination criteria associated with the data records to determine whether the current system is a master system of the plurality of systems, wherein each data object has an associated customized determination criteria table, and wherein determination criteria stored in a first field of a customized determination criteria table links a plurality of other tables for specifying whether the plurality of systems are master systems or dependent systems and the customized determination criteria table further includes a role in a second field;
   if the current system is determined to be the master system based on the first and second fields in the customized determination criteria table, the method further comprises:
   (1) performing an end-of-purpose determination in the current system and its dependent systems; and
   (2) blocking access to the data records; and
   if the current system is determined not to be the master system based on the determination criteria, the method further comprises determining whether related data objects exist in the master system.

2. The method of claim 1 wherein if the current system is not the master system and related data objects exist in the master system, the method further comprises:
   (1) performing a local end-of-purpose determination in the current system only; and
   (2) communicating a start-of-retention time indication to the master system.

3. The method of claim 1 wherein if the current system is not the master system and related data objects do not exist in the master system, the method further comprises:
   (1) performing a local end-of-purpose determination in the current system and its dependent systems; and
   (2) blocking access to the data records.

4. The method of claim 1 further comprising:
   generating a start-of-retention time for the data records when it is determined that the end of purpose has been reached; and
   storing the start-of-retention time in a data record.

5. The method of claim 1 further comprising allowing continued access to the data records when it is determined that the end of purpose for the data records has not been reached.

6. The method of claim 1 wherein the data records include private data of the entity that is subject to retention time restrictions.

7. The method of claim 1 wherein the master system is the system in which the data records were created.

8. A system for blocking data access in a network comprising a plurality of systems comprising:
   a processor in communication with a database via a communication link;
   a memory system coupled with the processor and configured to store computer code, which when executed by the processor, causes the processor to perform operations comprising:
   receiving an indication in a current system of the plurality of systems of an occurrence of an event that indicates an end of purpose determination is to be performed for one or more applications utilizing data records associated with a plurality of related data objects on the plurality of systems, the data objects corresponding to an entity, and wherein the related data objects are synchronized between the plurality of systems;
   analyzing determination criteria associated with the data records to determine whether the current system is a master system of the plurality of systems, wherein each data object has an associated customized determination criteria table, and wherein determination criteria stored in a first field of a customized determination criteria table links a plurality of other tables for specifying whether the plurality of systems are master systems or dependent systems and the customized determination criteria table further includes a role in a second field;
   if the current system is determined to be the master system based on the first and second fields in the customized determination criteria table, the operations further comprise:
      (1) performing an end-of-purpose determination in the current system and its dependent systems when the current system is determined to be the master system based on the determination criteria; and
      (2) blocking access to the data records when it is determined that the end of purpose has been reached; and
   if the current system is determined not to be the master system based on the determination criteria, the operations further comprise determining whether related data objects exist in the master system.

9. The system of claim 8 wherein if the current system is not the master system and related data objects exist in the master system, the operations further comprise:
   (1) performing a local end-of-purpose determination in the current system only; and
   (2) communicating a start-of-retention time indication to the master system.

10. The system of claim 8 wherein if the current system is not the master system and related data objects do not exist in the master system, the operations further comprise:
    (1) performing a local end-of-purpose determination in the current system and its dependent systems; and
    (2) blocking access to the data records.

11. The system of claim 8 wherein the operations further comprise:
    generating a start-of-retention time for the data records when it is determined that the end of purpose has been reached; and
    storing the start-of-retention time in a data record.

12. The system of claim 8 wherein the operations further comprise allowing continued access to the data records when it is determined that the end of purpose has not been reached.

13. The system of claim 8 wherein the data records include private data that is subject to retention time restrictions.

14. The system of claim 8 wherein the master system is the system in which the data records were created.

15. A non-transitory computer readable storage medium tangibly embodying computer code, which when executed by a computer system, causes the computer system to perform operations for blocking data access in a network comprising a plurality of systems, the operations comprising:
    receiving an indication in a current system of the plurality of systems of an occurrence of an event that indicates an end of purpose determination is to be performed for one or more applications utilizing data records associated with a plurality of related data objects on the plurality of systems, the data objects corresponding to an entity, and wherein the related data objects are synchronized between the plurality of systems;
    analyzing determination criteria associated with the data records to determine whether the current system is a master system of the plurality of systems, wherein each data object has an associated customized determination criteria table, and wherein determination criteria stored in a first field of a customized determination criteria table links a plurality of other tables for specifying whether the plurality of systems are master systems or dependent systems and the customized determination criteria table further includes a role in a second field;
    if the current system is determined to be the master system based on the first and second fields in the customized determination criteria table, the operations further comprise:
       (1) performing an end-of-purpose determination in the current system and its dependent systems; and
       (2) blocking access to the data records when it is determined that the end of purpose has been reached; and
    if the current system is determined not to be the master system based on the determination criteria, the operations further comprise determining whether related data objects exist in the master system.

16. The computer readable storage medium of claim 15 wherein if the current system is not the master system and the related data objects exist in the master system, the operations further comprise:
   (1) performing a local end-of-purpose determination in the current system only; and
   (2) communicating a start-of-retention time indication to the master system.

17. The computer readable storage medium of claim 15 wherein if the current system is not the master system and related data objects do not exist in the master system, the operations further comprise:
   (1) performing a local end-of-purpose determination in the current system and its dependent systems; and
   (2) blocking access to the data records.

18. The computer readable storage medium of claim 16 wherein the operations further comprise:
   generating a start-of-retention time for the data records when it is determined that the end of purpose has been reached; and
   storing the start-of-retention time in a data record.

* * * * *